United States Patent
Toyooka et al.

(10) Patent No.: US 12,130,062 B2
(45) Date of Patent: Oct. 29, 2024

(54) REFRIGERATION DEVICE, TEMPERATURE SENSOR MOUNTING PIPE, AND TEMPERATURE SENSOR MOUNTING STRUCTURE

(71) Applicant: PHC Holdings Corporation, Tokyo (JP)

(72) Inventors: Takashi Toyooka, Saitama (JP); Minoru Suto, Gunma (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 279 days.

(21) Appl. No.: 17/575,972

(22) Filed: Jan. 14, 2022

(65) Prior Publication Data

US 2022/0136752 A1    May 5, 2022

Related U.S. Application Data

(63) Continuation of application No. PCT/JP2020/024671, filed on Jun. 23, 2020.

(30) Foreign Application Priority Data

Jul. 18, 2019  (JP) .................................. 2019-132820
Jul. 18, 2019  (JP) .................................. 2019-132828

(51) Int. Cl.
*F25B 7/00*        (2006.01)
*F25B 49/02*       (2006.01)

(52) U.S. Cl.
CPC .............. *F25B 49/022* (2013.01); *F25B 7/00* (2013.01); *F25B 2313/031* (2013.01); *F25B 2700/2103* (2013.01)

(58) Field of Classification Search
CPC .... F25B 49/02; F25B 49/022; F25B 2400/16; F25B 2700/2103; F25B 2600/021;
(Continued)

(56) References Cited

U.S. PATENT DOCUMENTS 4,586,829 A * 5/1986 Hubner ................. G01K 13/02
                                                            374/E13.006
2006/0243027 A1* 11/2006 Nelson .................... G01K 1/08
                                                                73/23.31

FOREIGN PATENT DOCUMENTS

EP     2889560 A1 *  7/2015  ............. F25B 49/02
JP    S58174822 A  * 10/1983
(Continued)

OTHER PUBLICATIONS

International Search Report and Written Opinion issued in International Patent Application No. PCT/JP2020/024671, dated Aug. 11, 2020; with partial English translation.
(Continued)

*Primary Examiner* — Harry E Arant
(74) *Attorney, Agent, or Firm* — Rimon P.C.

(57) ABSTRACT

This refrigeration device comprises: a high temperature side refrigerant circuit in which a high temperature side refrigerant circulates; a low temperature side refrigerant circuit in which a low temperature side refrigerant circulates; and a cascade heat exchanger that cools the low temperature side refrigerant with the high temperature side refrigerant. In the low temperature side refrigerant circuit, a low temperature side decompressor is disposed downstream of the cascade heat exchanger and a temperature sensor is installed in a piping portion between the cascade heat exchanger and the low temperature side decompressor.

10 Claims, 8 Drawing Sheets

(58) Field of Classification Search
CPC ...... F25B 2313/031; F25B 2700/21163; F25B 7/00; G01K 1/143; G01K 13/026; G01K 1/08; G01K 13/00
See application file for complete search history.

(56) References Cited

FOREIGN PATENT DOCUMENTS

| | | | |
|---|---|---|---|
| JP | H07-027621 A | | 1/1995 |
| JP | H08-061797 A | | 3/1996 |
| JP | H11-201569 A | | 7/1999 |
| JP | 2004361217 A | * | 12/2004 |
| JP | 2007-218460 A | | 8/2007 |
| JP | 2019-090595 A | | 6/2019 |

OTHER PUBLICATIONS

Extended European Search Report dated Jul. 27, 2022 issued in the corresponding European Patent Application No. 20838880.1.

* cited by examiner

REFRIGERATION DEVICE, TEMPERATURE SENSOR MOUNTING PIPE, AND TEMPERATURE SENSOR MOUNTING STRUCTURE

CROSS-REFERENCE OF RELATED APPLICATIONS

This application is a Continuation of International Patent Application No. PCT/JP2020/024671, filed on Jun. 23, 2020, which in turn claims the benefit of Japanese Application No. 2019-132828, filed on Jul. 18, 2019, and Japanese Application No. 2019-132820, filed on Jul. 18, 2019 the entire disclosures of which Applications are incorporated by reference herein.

TECHNICAL FIELD

The present disclosure relates to a refrigeration apparatus, and in particular to a refrigeration apparatus including a two-way refrigerant circuit, a temperature sensor attaching pipe and a temperature sensor attaching structure.

BACKGROUND ART

In the related art, a refrigeration apparatus that includes a two-way refrigerant circuit with a high-temperature side refrigerant circuit and a low-temperature side refrigerant circuit and cools the refrigerant in the low-temperature side refrigerant circuit by the refrigerant in the high-temperature side refrigerant circuit is used as disclosed in PTL 1, for example.

In general, in a refrigeration apparatus, the machine to be controlled such as a compressor is controlled such that the temperature of the storage unit in which the cooling object is disposed is set to the target temperature.

CITATION LIST

Patent Literature

PTL 1
Japanese Patent Application Laid-Open No. H11-201569

SUMMARY OF INVENTION

Technical Problem

In the case where a refrigeration apparatus has a two-way refrigerant circuit, the configuration is complicated due to the refrigerant circuits of two systems. Therefore, simple detection of the temperature inside the storage unit and control of the machine to be controlled to set its temperature to the target temperature alone may not necessarily achieve efficient operation.

An object of the present disclosure is to more efficiently operate a refrigeration apparatus.

Solution to Problem

A refrigeration apparatus according to the present disclosure includes: a high-temperature side refrigerant circuit in which high-temperature side refrigerant circulates; a low-temperature side refrigerant circuit in which low-temperature side refrigerant circulates; and a cascade heat exchanger configured to cool the low-temperature side refrigerant by using the high-temperature side refrigerant. In the low-temperature side refrigerant circuit, a low-temperature side decompressor is disposed on a downstream of the cascade heat exchanger, and a temperature sensor is installed at a pipe part between the cascade heat exchanger and the low-temperature side decompressor.

Advantageous Effects of Invention

According to the present disclosure, it is possible to more efficiently operate a refrigeration apparatus.

DESCRIPTION OF EMBODIMENTS

An embodiment of the present disclosure is described in detail below with reference to the accompanying drawings. Note that Embodiment described below is merely an example, and the present disclosure is not limited to the present embodiment.

Embodiment 1

Figure 1:
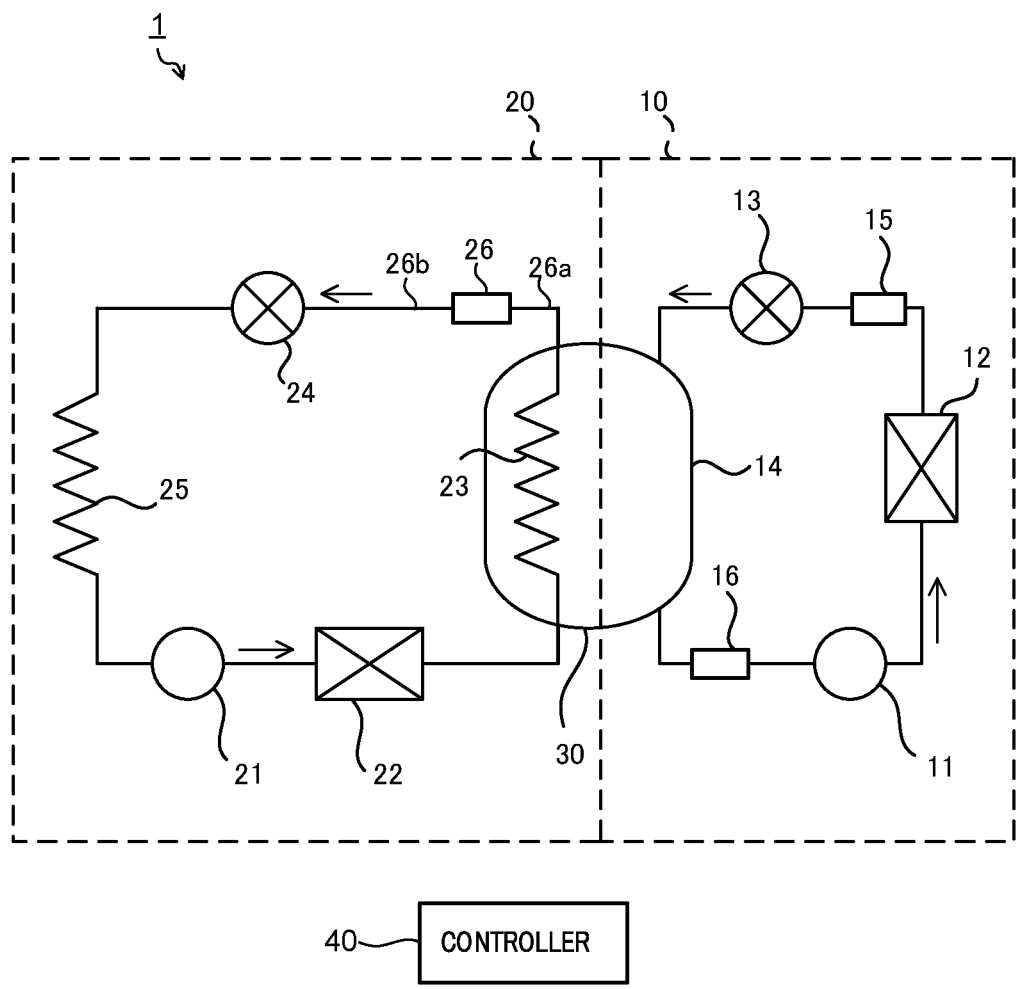
FIG. 1 is a circuit diagram of a refrigeration apparatus according to Embodiment 1 of the present disclosure.

FIG. 1 illustrates an exemplary refrigerant circuit provided in a refrigeration apparatus according to Embodiment 1 of the present disclosure. Refrigerant circuit 1 is provided in a refrigeration apparatus such as an ultra-low-temperature freezer in which the inner temperature of the storage unit is −80° C. or below, for example.

Refrigerant circuit 1 is a two-way refrigerant circuit including high-temperature side refrigerant circuit 10 and low-temperature side refrigerant circuit 20 in which refrigerant is circulated independently of each other.

High-temperature side refrigerant circuit 10 includes high-temperature side compressor 11, high-temperature side condenser 12, high-temperature side decompressor 13, high-temperature side evaporator 14, dryer 15, and liquid receiver 16.

High-temperature side evaporator 14 is the outer pipe of cascade heat exchanger 30 described later, and surrounds second heat exchanger 23 described later.

The above-mentioned devices are connected through a predetermined pipe (high-temperature side pipe) such that the refrigerant (high-temperature side refrigerant) discharged from high-temperature side compressor 11 again returns to high-temperature side compressor 11. The high-temperature side refrigerant circulates in the arrow direction of FIG. 1. Specifically, in high-temperature side refrigerant circuit 10, the high-temperature side refrigerant flows through high-temperature side compressor 11, high-temperature side condenser 12, dryer 15, high-temperature side decompressor 13, high-temperature side evaporator 14, and liquid receiver 16 in this order, and returns back to high-temperature side compressor 11. Note that the temperature can be reduced to approximately −40° C. at high-temperature side evaporator 14 through the freezing cycle in high-temperature side refrigerant circuit 10.

Low-temperature side refrigerant circuit 20 includes low-temperature side compressor 21, first heat exchanger 22, second heat exchanger 23, low-temperature side decompressor 24, low-temperature side evaporator 25, and large surface area part 26.

The above-mentioned devices are connected through a predetermined pipe (low-temperature side pipe) such that the refrigerant (low-temperature side refrigerant) discharged from low-temperature side compressor 21 again returns to low-temperature side compressor 21. The low-temperature side refrigerant circulates in the arrow direction of FIG. 1. Specifically, in low-temperature side refrigerant circuit 20, the low-temperature side refrigerant flows through low-temperature side compressor 21, first heat exchanger 22, second heat exchanger 23, large surface area part 26, low-temperature side decompressor 24, and low-temperature side evaporator 25 in this order, and returns back to low-temperature side compressor 21. Note that an ultra-low temperature of −80° C. or below can be obtained at low-temperature side evaporator 25 through the freezing cycle in low-temperature side refrigerant circuit 20.

First heat exchanger 22 cools the refrigerant passing through its inside in the gas phase. Note that first heat exchanger 22 may be a condenser that condenses the refrigerant passing through its inside.

Second heat exchanger 23 is the inner pipe of cascade heat exchanger 30. Specifically, second heat exchanger 23 serving as the inner pipe is surrounded by high-temperature side evaporator 14 serving as the outer pipe. In cascade heat exchanger 30, the heat is exchanged between the low temperature refrigerant passing inside high-temperature side evaporator 14, and the high temperature refrigerant passing inside second heat exchanger 23. At this time, the high temperature refrigerant passing inside second heat exchanger 23 condenses. Note that in the case where first heat exchanger 22 is a condenser, second heat exchanger 23 cools the refrigerant in the liquid phase passing through its inside.

In addition, large surface area part 26 in which the low-temperature side refrigerant flows is disposed between upstream side pipe 26a located on the downstream side of second heat exchanger 23 and downstream side pipe 26b located on the upstream side of low-temperature side decompressor 24. Large surface area part 26 is a portion with a larger surface area per unit length in the direction in which the refrigerant flows, than the low-temperature side pipe, especially upstream side pipe 26a and downstream side pipe 26b. Large surface area part 26 is, for example, a large diameter pipe or a container-shaped member. The large diameter pipe is a pipe with a larger volume per unit length in the direction in which the refrigerant flows than at least upstream side pipe 26a and downstream side pipe 26b. In addition, the container-shaped member is, for example, a dehydrator that adsorbs the moisture inside low-temperature side refrigerant circuit 20. In addition, large surface area part 26 may be a pipe with the same internal diameter as the internal diameter of upstream side pipe 26a and downstream side pipe 26b, and a thickness greater than that of upstream side pipe 26a and downstream side pipe 26b. In the following description, large surface area part 26 is assumed as a container-shaped member.

Upstream side pipe 26a is connected to large surface area part 26 from the upstream side. Upstream side pipe 26a may connect between second heat exchanger 23 and large surface area part 26.

Downstream side pipe 26b is connected to large surface area part 26 from the downstream side. Downstream side pipe 26b may connect between large surface area part 26 and low-temperature side decompressor 24.

In addition, the refrigerant that flows into large surface area part 26 is liquid.

Thus, large surface area part 26 temporarily stores the liquid refrigerant (low-temperature side refrigerant) that flows into large surface area part 26 from the upstream side and flows out to the downstream side of large surface area part 26. In other words, it flows at a relatively low speed inside large surface area part 26. Temperature sensor T1 that detects the temperature of the refrigerant passing through its inside is installed at the surface of large surface area part 26.

Each of high-temperature side refrigerant circuit 10 and low-temperature side refrigerant circuit 20 may include an auxiliary machine not illustrated in the drawing. In the case where the auxiliary machines are disposed between second heat exchanger 23 and low-temperature side decompressor 24 in low-temperature side refrigerant circuit 20, temperature sensor T1 may be installed on the surface of the auxiliary machines.

The detection value of temperature sensor T1 is input to controller 40 provided in refrigeration apparatus. Controller 40 controls at least one of an inverter that adjusts high-temperature side compressor 11 or its rotational frequency, and an inverter that adjusts low-temperature side compressor 21 or its rotational frequency on the basis of the set temperature of the storage unit, the detection value of temperature sensor T1 and the like. Note that it goes without saying that refrigeration apparatus may include a temperature sensor other than temperature sensor T1 such as a temperature sensor that detects the temperature inside the storage unit, and that controller 40 may control the machine to be controlled on the basis of the detection value of a plurality of temperature sensors including temperature sensor T1.

In refrigerant circuit 1 having the above-mentioned configuration, the cooling object disposed in the storage unit is cooled by the refrigerant flowing inside low-temperature side evaporator 25, i.e., the refrigerant (low-temperature side refrigerant) circulating inside low-temperature side refrigerant circuit 20. In addition, temperature sensor T1 is installed on low-temperature side refrigerant circuit 20 side.

That is, temperature sensor T1 can detect the temperature of the low-temperature side refrigerant that directly acts on the cooling of the cooling object, not the temperature of the high-temperature side refrigerant that indirectly acts on the cooling of the cooling object. Thus, more efficient operation of refrigerant circuit 1 can be achieved by controlling the machine to be controlled such as high-temperature side compressor 11 or low-temperature side compressor 21 by using the detection value of temperature sensor T1.

Moreover, temperature sensor T1 is installed at a position where refrigerant in the liquid phase, not gas phase or gas-liquid mixed state, flows, or more specifically, at the pipe part located on the downstream side of second heat exchanger 23 and on the upstream side low-temperature side decompressor 24. Liquid has a larger thermal conductivity than gas. Thus, in the case where the temperature of the flowing refrigerant is changed, the temperature change of the refrigerant can be detected more quickly at the portion where the refrigerant in the liquid phase flows than at the portion where the refrigerant in the gas phase flows. That is, according to the present embodiment, the temperature change of the refrigerant flowing through the low-temperature side refrigerant circuit can be detected more quickly, and in turn, more efficient operation of refrigerant circuit 1 can be achieved.

In addition, low-temperature side evaporator 25, which is a portion where the refrigerant with the lowest temperature in refrigerant circuit 1 flows, is sealed in a heat insulation material and disposed to surround the storage unit where the cooling object disposed. As such, if temperature sensor T1 is installed at low-temperature side evaporator 25 or the pipe in the vicinity of low-temperature side evaporator 25 on its upstream or downstream side, temperature sensor T1 is also sealed in the heat insulation material, thus making it necessary to peel off the heat insulation material at the maintenance. That is, this makes it difficult to perform the maintenance of temperature sensor T1. In the present embodiment, on the other hand, temperature sensor T1 is disposed at a portion between second heat exchanger 23 and low-temperature side decompressor 24, i.e., a portion that need not necessarily be sealed in the heat insulation material. Thus, according to the present embodiment, the maintenance of temperature sensor T1 or its attaching structure can be readily performed.

Note that the temperature of the refrigerant flowing inside large surface area part 26 is sufficiently lower than the outside air, while it is higher than the refrigerant flowing inside low-temperature side evaporator 25. As such, there is a possibility of adhesion of condensation water or ice to large surface area part 26, i.e., a portion around temperature sensor T1. If condensation water adheres to a portion around temperature sensor T1, the detection temperature may become inaccurate. In addition, if ice adheres to it, temperature sensor T1 may be damaged.

Figure 2:
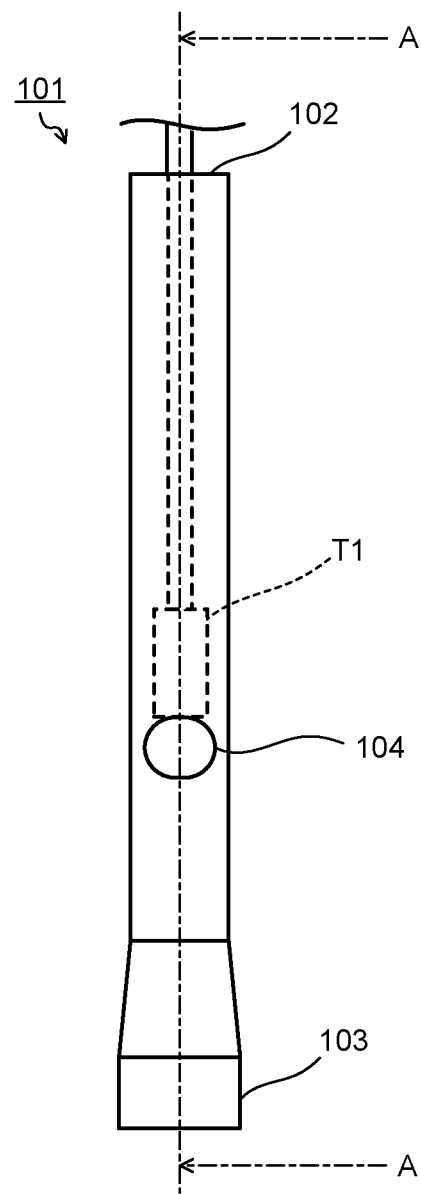
FIG. 2 is a front view of a temperature sensor attaching pipe according to Embodiment 1 of the present disclosure.
Figure 3:
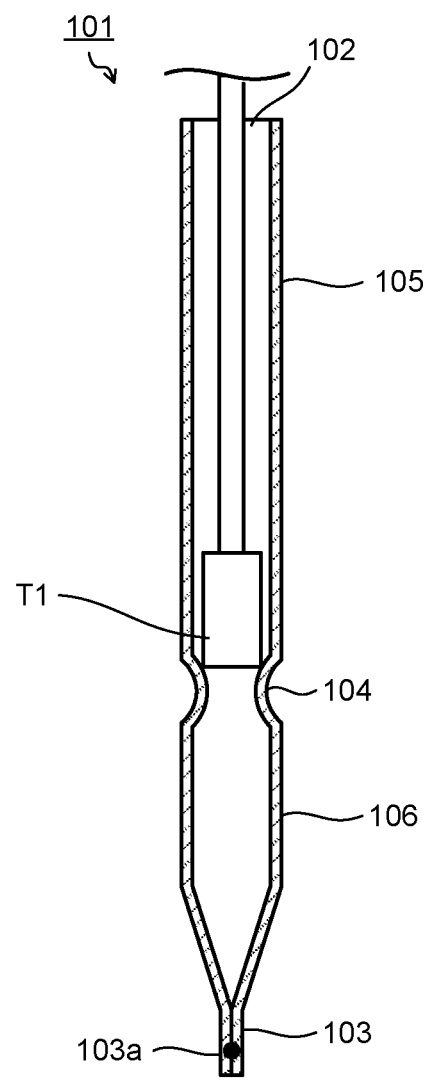
FIG. 3 is a longitudinal sectional view of the temperature sensor attaching pipe according to Embodiment 1 of the present disclosure.

To prevent the occurrence of such a situation, it is possible to use a temperature sensor attaching pipe for housing temperature sensor T1 in the state where it is blocked from the outside air. FIG. 2 is a front view of temperature sensor attaching pipe 101 according to Embodiment 1. FIG. 3 is a cross-sectional view taken along A-A of FIG. 2, i.e., a longitudinal sectional view of temperature sensor attaching pipe 101.

Temperature sensor attaching pipe 101 is formed by processing a pipe made of metal such as copper. One end of temperature sensor attaching pipe 101 is open, and makes up opening end part 102. FIG. 2 and FIG. 3 illustrate temperature sensor attaching pipe 101 in which opening end part 102 is disposed on the upper side. The following description assumes that opening end part 102 is located on the upper side, but it goes without saying that opening end part 102 need not necessarily be located on the upper side.

The other end of temperature sensor attaching pipe 101 is sealed, and makes up seal end part 103. Seal end part 103 is formed in such a manner that the other end of temperature sensor attaching pipe 101 is caulked into such a state as two overlapping flat plates, and then the opposite plate-shaped portions are welded together to seal the gap between the opposite portions with welding part 103a. For the purpose of complete sealing, welding part 103a extends to the right end from the left end of plate-shaped portion.

Constricted part 104 is formed by caulking a portion between opening end part 102 and seal end part 103. While a gap is left inside constricted part 104 in the example illustrated in FIG. 2, constricted part 104 may be formed with no gap through caulking.

First intermediate part 105 is formed between opening end part 102 and constricted part 104. First intermediate part 105 is a portion with a hollow pipe shape whose one end is constricted.

Second intermediate part 106 is formed between seal end part 103 and constricted part 104. Second intermediate part 106 is a portion with a hollow pipe shape whose both ends are constricted. The distance between seal end part 103 and constricted part 104, i.e., the length of second intermediate part 106 is greater than the length of welding part 103a.

FIG. 3 illustrates temperature sensor T1 inserted to temperature sensor attaching pipe 101 from the opening end part. Temperature sensor T1 is placed on constricted part 104. Note that temperature sensor T1 may be sandwiched by constricted part 104. With temperature sensor attaching pipe 101, a position of temperature sensor T1 can be set at a predetermined position not only when it is placed on constricted part 104, but also when it is sandwiched by constricted part 104.

Figure 4:
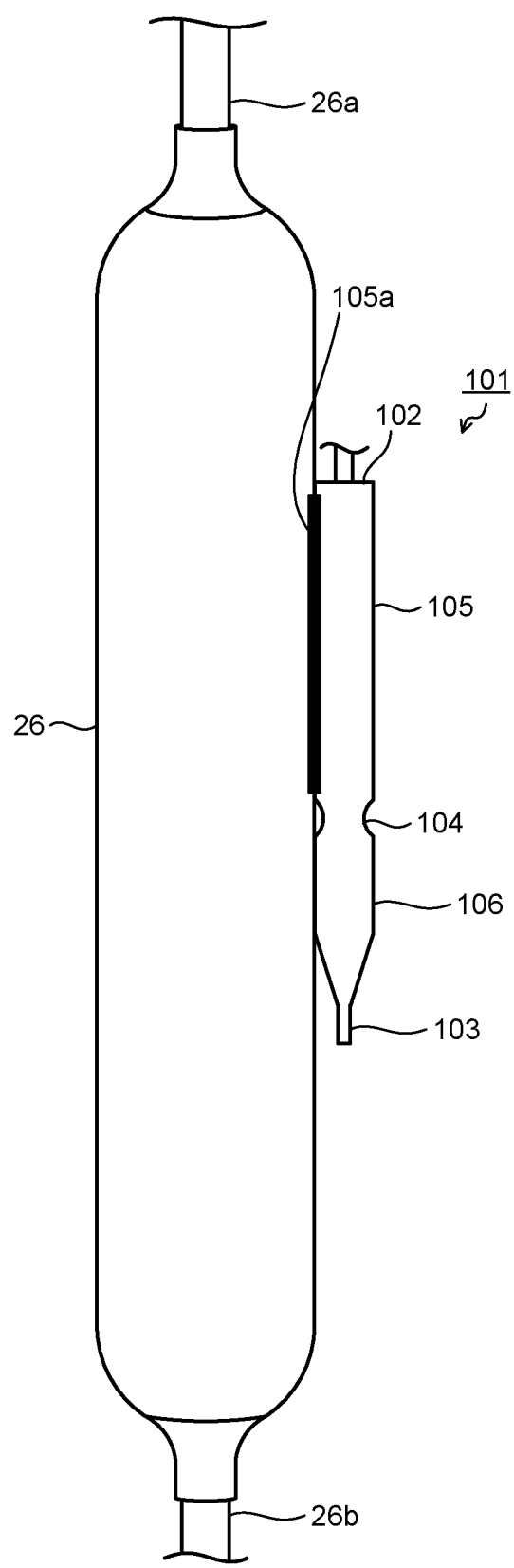
FIG. 4 is a diagram illustrating a temperature sensor attaching structure according to Embodiment 1 of the present disclosure.

FIG. 4 is a diagram illustrating a temperature sensor attaching structure according to Embodiment 1 of the present disclosure. Temperature sensor attaching pipe 101 is attached to metal large surface area part 26 by welding. To be more specific, first intermediate part 105 is welded to large surface area part 26 such that welding part 105a is formed.

In addition, temperature sensor attaching pipe 101 is attached such that temperature sensor T1 disposed in its inside, i.e., constricted part 104 is located at the center of large surface area part 26 in front view. By attaching it at such a position, the surface temperature of large surface area part 26 can be uniformly detected, and the temperature of the liquid in large surface area part 26 can be more correctly measured.

First intermediate part 105 is longer than the other parts that make up temperature sensor attaching pipe 101. Thus, the length of welding part 105a can be sufficiently ensured, and temperature sensor attaching pipe 101 can be reliably attached to large surface area part 26. Note that as long as temperature sensor attaching pipe 101 is reliably attached to large surface area part 26, the length and position of welding part 105a are not particularly limited.

When attaching temperature sensor attaching pipe 101 to large surface area part 26 by welding, heat is generated and transferred to temperature sensor attaching pipe 101. It should be noted that a sufficient distance is ensured between seal end part 103 and constricted part 104. To be more specific, as described above, the distance between seal end part 103 and constricted part 104 is greater than the length of welding part 103a. Thus, in the heat generated when attaching temperature sensor attaching pipe 101 to large surface area part 26 by welding, the amount of the heat transferred to seal end part 103 is sufficiently small, and the temperature rise at seal end part 103 is small. Thus, it is possible to prevent a situation where the sealing at seal end part 103 becomes insufficient due to welding part 103a melted at seal end part 103 when attaching temperature sensor attaching pipe 101 to large surface area part 26 by welding.

After it is attached by welding, temperature sensor T1 is inserted to the inside of temperature sensor attaching pipe 101 through opening end part 102. Since temperature sensor T1 is placed on constricted part 104 as described above, the position of temperature sensor T1 can be set at a predetermined position.

Note that as described above, temperature sensor T1 may be sandwiched by constricted part 104. In the case where temperature sensor T1 is sandwiched by constricted part 104, temperature sensor T1 does not rattle inside temperature sensor attaching pipe 101 even when large surface area part 26 vibrates under the influence of high-temperature side compressor 11 or low-temperature side compressor 21, for example, and it is possible to maintain the state where it is in contact with large surface area part 26 through temperature sensor attaching pipe 101 at all time. That is, the temperature of the refrigerant can be more correctly measured. In addition, with temperature sensor attaching pipe 101, the position of temperature sensor T1 can be set at a predetermined position not only when it is placed on constricted part 104 but also when it is sandwiched by constricted part 104.

After temperature sensor T1 is inserted, the opening of opening end part 102 is sealed by a sealing member of a paste form (not illustrated in the drawing), for example. In this manner, temperature sensor attaching pipe 101 is completely blocked from the outside air. Thus, for example, even in the case where large surface area part 26 has a low temperature or an extremely low temperature, it is possible to prevent inaccuracy of the temperature measurement due to adhesion, to temperature sensor T1, of water droplets generated by condensed moisture in the atmosphere, and damage to temperature sensor T1 due to adhesion of ice.

Note that seal end part 103 may be sealed by welding part 103a before temperature sensor attaching pipe 101 is attached to large surface area part 26, or may be sealed by welding part 103a after it is attached to large surface area part 26 through welding part 105a. In any case, the lower end part of temperature sensor attaching pipe 101 can be easily sealed in comparison with the case where it is sealed using, for example, a sealing member of a paste form since it can be sealed by only sealing welding end part 103. In the case where seal end part 103 is sealed after temperature sensor attaching pipe 101 is attached to large surface area part 26 and it is sealed using a sealing member of a paste form, it is especially advantageous since the operation posture tends to be unstable.

Note that seal end part 103 can be sealed through an easy operation in the case where seal end part 103 is sealed after temperature sensor attaching pipe 101 is attached to large surface area part 26 by employing the method in which opposite plate-shaped portions of seal end part 103 are sealed in the state where they are in contact with each other as a sealing method of seal end part 103. That is, in the case where sealing is performed without using a sealing member, it is not necessarily be sealed by welding part 103a.

Various methods may be employed as a sealing method of seal end part 103.

Seal end part 103 may be sealed through mechanical coupling such as caulking and pressing opposite plate-shaped portions of seal end part 103 together. Seal end part 103 may be sealed through material coupling such as braze welding, ultrasound welding, and welding. Alternatively, seal end part 103 may be sealed through chemical coupling such as adhesion.

When seal end part 103 is sealed by a combination of two or more of mechanical coupling, material coupling and chemical coupling, the sealing becomes more reliable, and temperature sensor T1 in temperature sensor attaching pipe 101 can be more reliably blocked from the outside air.

Embodiment 2

Incidentally, in the related art, the fixing apparatus of the temperature sensor disclosed in PTL 2 (Japanese Patent Application Laid-Open No. H08-082308) is proposed, for example.

However, the fixing apparatus disclosed in PTL 2 requires a caulking operation after the temperature sensor is inserted to the fixing apparatus. As such, there is a problem of complicated attaching operation. In addition, in the fixing apparatus disclosed in PTL 2, the temperature sensor is exposed to the outside air. Consequently, in the case where a portion whose temperature is to be measured by the temperature sensor has a low temperature, the temperature measurement may become inaccurate due to condensation of the moisture in the outside air. Further, in the case where the portion whose temperature is to be measured by the temperature sensor has an extremely low temperature, the temperature sensor may be damaged due to coagulation of the moisture in the outside air.

Under such a circumstance, an object of the present disclosure is to provide a temperature sensor attaching pipe and a temperature sensor attaching structure that can easily attach temperature sensor, and can correctly measure the temperature without damaging the temperature sensor.

The temperature sensor attaching pipe according to the present disclosure is metallic, and includes an opening end part including an opening configured for insertion of a temperature sensor, a seal end part, and a constricted part disposed between the opening end part and the seal end part.

In addition, the temperature sensor attaching structure according to the present disclosure includes the temperature sensor attaching pipe and an object which is metallic and to which the temperature sensor attaching pipe is attached. A portion located between the opening end part and the constricted part is attached to the object by welding.

With the temperature sensor attaching pipe and the temperature sensor attaching structure according to the present disclosure, the temperature sensor can be easily attached, and the temperature can be correctly measured without damaging the temperature sensor.

Embodiment 2 of the present disclosure is described in detail below with reference to the accompanying drawings.

Figure 5:
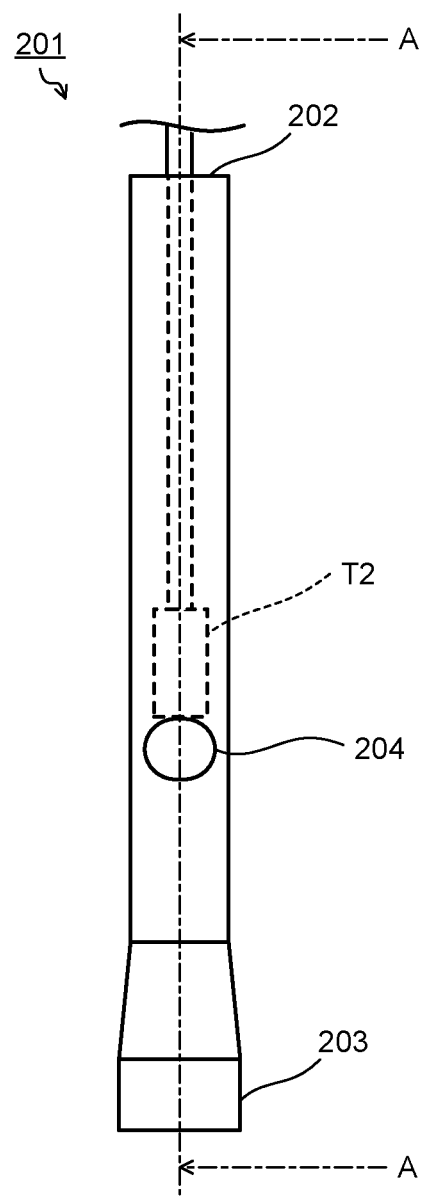
FIG. 5 is a front view of a temperature sensor attaching pipe according to Embodiment 2 of the present disclosure.
Figure 6:
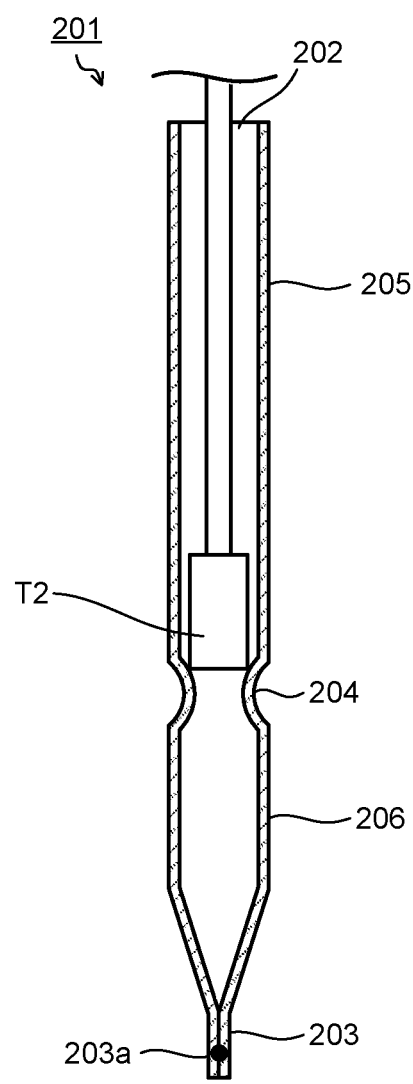
FIG. 6 is a longitudinal sectional view of the temperature sensor attaching pipe according to Embodiment 2 of the present disclosure.

FIG. 5 is a front view of temperature sensor attaching pipe 201 according to Embodiment 2 of the present disclosure, and FIG. 6 is a cross-sectional view taken along A-A of FIG. 5, i.e., a longitudinal sectional view of the temperature sensor attaching pipe according to the present disclosure 201. Temperature sensor attaching pipe 201 is formed by processing a pipe made of metal such as copper. One end of temperature sensor attaching pipe 201 is open, and makes up opening end part 202. FIG. 5 and FIG. 6 illustrate temperature sensor attaching pipe 201 with opening end part 202 disposed at a location on the upper side. The following description assumes that opening end part 202 is located on the upper side, but it goes without saying that opening end part 202 need not necessarily be located on the upper side The other end of temperature sensor attaching pipe 201 is sealed, and makes up seal end part 203. Seal end part 203 is formed in such a manner that the other end of temperature sensor attaching pipe 201 is caulked into such a state as two flat plates being overlapped each other, and then the opposite plate-shaped portions are welded together to seal the gap between the opposite portions with welding part 203a. For the purpose of complete sealing, welding part 203a extends to the right end from the left end of plate-shaped portion.

Constricted part 204 is formed by caulking the portion between opening end part 202 and seal end part 203. While a gap is left inside constricted part 204 in the example illustrated in FIG. 5, constricted part 204 may be formed with no gap through caulking.

First intermediate part 205 is formed between opening end part 202 and constricted part 204. First intermediate part 205 is a portion with a hollow pipe shape whose one end is constricted.

Second intermediate part 206 is formed between seal end part 203 and constricted part 204. Second intermediate part 206 is a portion with a hollow pipe shape whose both ends are constricted. The distance between seal end part 203 and constricted part 204, i.e., the length of second intermediate part 206 is greater than the length of welding part 203a.

FIG. 6 illustrates temperature sensor T2 inserted from the opening end part of temperature sensor attaching pipe 201. Temperature sensor T2 is placed on constricted part 204.

Figure 7:
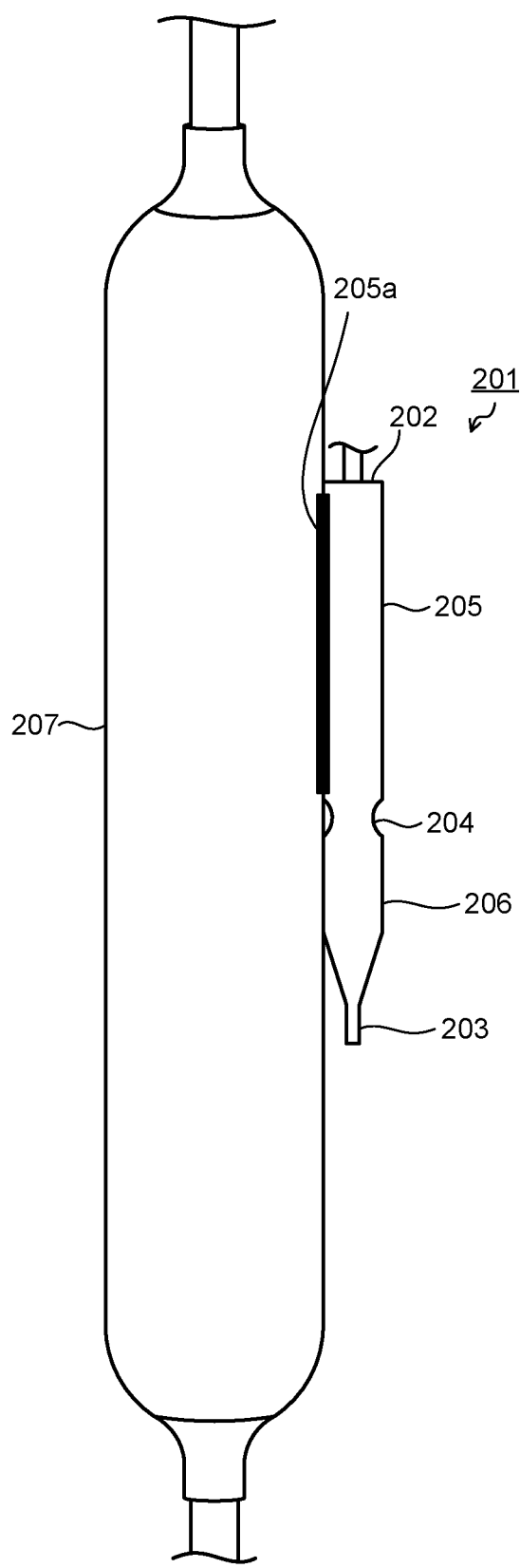
FIG. 7 is a diagram illustrating a temperature sensor attaching structure according to Embodiment 2 of the present disclosure.

FIG. 7 is a diagram illustrating a temperature sensor attaching structure according to Embodiment 2 of the present disclosure. Large surface area part 207 is an object to which temperature sensor attaching pipe 201 is to be attached and is made of metal. Temperature sensor attaching pipe 201 is attached by welding to large surface area part 207. To be more specific, first intermediate part 205 is welded to large surface area part 207 such that welding part 205a is formed.

Here, large surface area part 207 has a larger surface area per unit length in the direction in which the refrigerant flows than the pipe connected to large surface area part 207 from the upstream side and the pipe connected to large surface area part 207 from the downstream side. Large surface area part 207 is, for example, a large diameter pipe or a container-shaped member. The large diameter pipe is a pipe with a larger volume per unit length in the direction in which the refrigerant flows, than the pipe connected to at least large surface area part 207. In addition, the container-shaped member is, for example, a dehydrator that adsorbs the moisture inside low-temperature side refrigerant circuit 220. In addition, large surface area part 207 may be a pipe with the same internal diameter as the internal diameter of pipe connected to large surface area part 207, and a thickness larger than that of the pipe. In the following description, large surface area part 207 is assumed as a container-shaped member.

In addition, temperature sensor attaching pipe 201 is attached such that temperature sensor T2 disposed in its inside, i.e., constricted part 204 is located at the center of large surface area part 207 in front view. By attaching it at such a position, the surface temperature of large surface area part 207 can be uniformly detected, and the temperature of the liquid inside large surface area part 207 can be more correctly measured.

First intermediate part 205 is longer than longer than the other parts that make up temperature sensor attaching pipe 201. Thus, the length of welding part 205a can be sufficiently ensured, and temperature sensor attaching pipe 201 can be reliably attached to large surface area part 207. Note that as long as temperature sensor attaching pipe 201 can be reliably attached to large surface area part 207, the length and position of welding part 205a are not particularly limited.

When attaching temperature sensor attaching pipe 201 to large surface area part 207 by welding, heat is generated and transferred to temperature sensor attaching pipe 201. It should be noted that a sufficient distance is ensured between seal end part 203 and constricted part 204. To be more specific, as described above, the distance between seal end part 203 and constricted part 204 is greater than the length of welding part 203a. Thus, in the heat generated when attaching temperature sensor attaching pipe 201 to large surface area part 207 by welding, the amount of the heat transferred to seal end part 203 is sufficiently small, and the temperature rise at seal end part 203 is small. Thus, it is possible to prevent a situation where the sealing of seal end part 203 becomes insufficient due to melting of welding part 203a at seal end part 203 when attaching temperature sensor attaching pipe 201 to large surface area part 207 by welding.

After it is attached by welding, temperature sensor T2 is inserted to the inside of temperature sensor attaching pipe 201 through opening end part 202. Since temperature sensor T2 is placed on constricted part 204 as described above, a position of temperature sensor T2 can be set at a predetermined position.

Note that temperature sensor T2 may be sandwiched by constricted part 204. In the case where temperature sensor T2 is sandwiched by constricted part 204, even when the object such as large surface area part 207 is a vibrating member, temperature sensor T2 does not rattle inside temperature sensor attaching pipe 201 and it is possible to maintain the state where it is in contact with the object through temperature sensor attaching pipe 201 at all time. That is, the temperature of the measurement target object can be more correctly measured. With temperature sensor attaching pipe 201, the position of temperature sensor T2 can be set at a predetermined position also when it is sandwiched by constricted part 204 as when it is placed on constricted part 204.

After temperature sensor T2 is inserted, the opening of opening end part 202 is sealed by a sealing member of a paste form (not illustrated in the drawing), for example. In this manner, temperature sensor attaching pipe 201 is completely blocked from the outside air. Thus, for example, even in the case where the object such as large surface area part 207 has a low temperature or an extremely low temperature, it is possible to prevent inaccuracy of the temperature measurement due to adhesion, to temperature sensor T2, of water droplets generated by condensed moisture in the atmosphere, and damage to temperature sensor T2 due to adhesion of ice.

Note that seal end part 203 may be sealed by welding part 203a before temperature sensor attaching pipe 201 is attached to large surface area part 207, or may be sealed by welding part 203a after it is attached to large surface area part 207 through welding part 205a. In any case, the lower end part of temperature sensor attaching pipe 201 can be easily sealed in comparison with the case where it is sealed using, for example, a sealing member of a paste form since it can be sealed by simply welding seal end part 203. In the case where seal end part 203 is sealed after large surface area part 207 is attached to temperature sensor attaching pipe 201 and it is sealed using a sealing member of a paste form, it is especially advantageous since the operation posture tends to be unstable.

Note that seal end part 203 can be sealed through an easy operation in the case where seal end part 203 is sealed after temperature sensor attaching pipe 201 is attached to large surface area part 207 by employing a method in which the opposite plate-shaped portions of seal end part 203 are sealed in the state where they are in contact with each other as a sealing method of seal end part 203. That is, in the case where sealing is performed without using a sealing member, it is not necessarily be sealed by welding part 203a.

Various methods may be employed as a sealing method of seal end part 203. Seal end part 203 may be sealed through mechanical coupling such as caulking and pressing opposite plate-shaped portions of seal end part 203 together. Seal end part 203 may be sealed through material coupling such as braze welding, ultrasound welding, and welding. Alternatively, seal end part 203 may be sealed through chemical coupling such as adhesion.

When seal end part 203 is sealed by a combination of two or more of mechanical coupling, material coupling and chemical coupling, the sealing becomes more reliable, and temperature sensor T2 in temperature sensor attaching pipe 201 can be more reliably blocked from the outside air.

Next, specific examples to which temperature sensor attaching pipe 201 and the temperature sensor attaching structure according to the present disclosure are applied is described.

Figure 8:
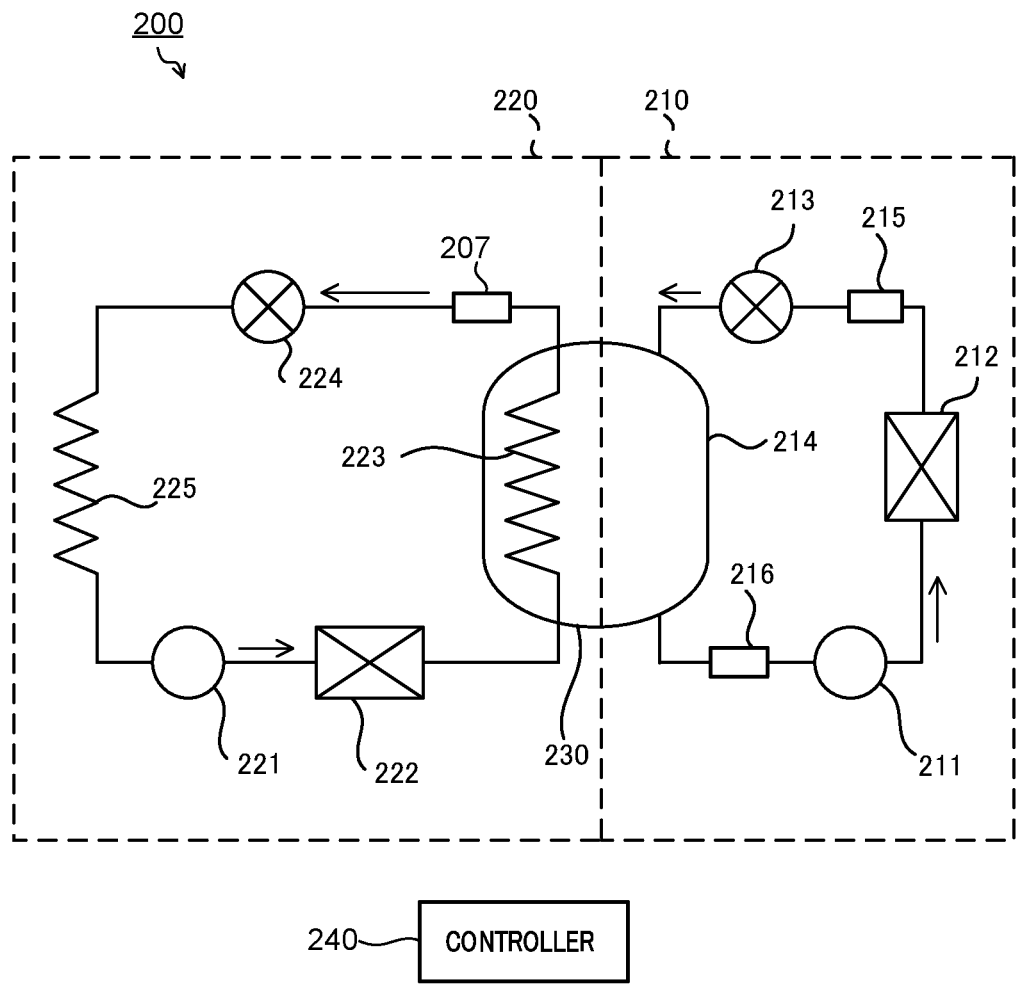
FIG. 8 is a diagram illustrating a refrigerant circuit provided in a refrigeration apparatus according to Embodiment 2 of the present disclosure.

FIG. 8 illustrates an exemplary refrigeration apparatus including a refrigerant circuit according to Embodiment 2 of the present disclosure. Refrigerant circuit 200 is provided in a refrigeration apparatus such as an ultra-low-temperature freezer in which the inner temperature of the storage unit is −80° C. or below, for example.

Refrigerant circuit 200 is a two-way refrigerant circuit including high-temperature side refrigerant circuit 210 and low-temperature side refrigerant circuit 220 in which refrigerant is circulated independently of each other.

High-temperature side refrigerant circuit 210 includes high-temperature side compressor 211, high-temperature side condenser 212, high-temperature side decompressor 213, high-temperature side evaporator 214, dryer 215, and liquid receiver 216.

High-temperature side evaporator 214 is the outer pipe of cascade heat exchanger 230 described later.

The above-mentioned devices are connected through a predetermined pipe (high-temperature side pipe) such that the refrigerant discharged from high-temperature side compressor 211 again returns to high-temperature side compressor 211. The high-temperature side refrigerant circulates in the arrow direction of FIG. 8. Specifically, in high-temperature side refrigerant circuit 210, the high-temperature side refrigerant flows through high-temperature side compressor 211, high-temperature side condenser 212, dryer 215, high-temperature side decompressor 213, high-temperature side evaporator 214, and liquid receiver 216 in this order, and returns back to high-temperature side compressor 211. Note that the temperature can be reduced to approximately −40° C. at high-temperature side evaporator 214 through the freezing cycle in high-temperature side refrigerant circuit 210.

Low-temperature side refrigerant circuit 220 includes low-temperature side compressor 221, first heat exchanger 222, second heat exchanger 223, low-temperature side decompressor 224, low-temperature side evaporator 225, and large surface area part 207.

The above-mentioned devices are connected through a predetermined pipe (low-temperature side pipe) such that the refrigerant discharged from low-temperature side compressor 221 again returns to low-temperature side compressor 221. The low-temperature side refrigerant circulates in the arrow direction of FIG. 8. Specifically, in low-temperature side refrigerant circuit 220, the low-temperature side refrigerant flows through low-temperature side compressor 221, first heat exchanger 222, second heat exchanger 223, large surface area part 207, low-temperature side decompressor 224, and low-temperature side evaporator 225 in this order, and returns back to low-temperature side compressor 221. Note that an ultra-low temperature of −80° C. or below can be obtained at low-temperature side evaporator 225 through the freezing cycle in low-temperature side refrigerant circuit 220.

First heat exchanger 222 cools the refrigerant passing through its inside in the gas phase. Note that first heat exchanger 222 may be a condenser that condenses the refrigerant passing through its inside.

Second heat exchanger 223 is the inner pipe of cascade heat exchanger 230. Specifically, second heat exchanger 223 serving as the inner pipe is surrounded by high-temperature side evaporator 214 serving as the outer pipe. In cascade heat exchanger 230, the heat is exchanged between the low temperature refrigerant passing inside high-temperature side evaporator 214 and the high temperature refrigerant passing inside second heat exchanger 223. At this time, the high temperature refrigerant passing inside second heat exchanger 223 condenses. Note that in the case where first heat exchanger 222 is a condenser, second heat exchanger 223 cools the refrigerant in the liquid phase passing through its inside.

In addition, large surface area part 207 is disposed on the downstream side of second heat exchanger 223 and on the upstream side of low-temperature side decompressor 224. Large surface area part 207 may be covered with a heat insulation material formed by foaming agent. In this case, temperature sensor attaching pipe 201 is also covered with the heat insulation material. However, since temperature sensor attaching pipe 201 is completely sealed as described above, the foaming agent does not enter temperature sensor attaching pipe 201. Thus, since the foaming agent is not interposed between temperature sensor T2 and large surface area part 207, the temperature of the measurement target object can be more correctly measured.

In addition, the refrigerant that flows into large surface area part 207 is liquid.

Thus, large surface area part 207 temporarily stores the liquid refrigerant that flows into large surface area part 207 from the upstream side and flows out to the downstream side of large surface area part 207. In other words, it flows at a relatively low speed inside large surface area part 207. Then, the temperature of the refrigerant passing through large surface area part 207 can be immediately transmitted to temperature sensor T2 through large surface area part 207, welding part 205a and temperature sensor attaching pipe 201.

Each of high-temperature side refrigerant circuit 210 and low-temperature side refrigerant circuit 220 may include an auxiliary machine not illustrated in the drawing. In addition, the auxiliary machines may be a portion to which temperature sensor attaching pipe 201 is attached.

The refrigeration apparatus including refrigerant circuit 200 includes controller 240. Controller 240 controls the rotational frequency and the like of high-temperature side compressor 211 and low-temperature side compressor 221 on the basis of the set temperature of the storage unit and the temperature detected by temperature sensor T2 and the like. With the temperature sensor attaching structure including temperature sensor attaching pipe 201 and temperature sensor attaching pipe 201, the temperature of the refrigerant inside large surface area part 207 can be more correctly measured. Thus, the rotational frequency and the like of high-temperature side compressor 211 and low-temperature side compressor 221 can be more appropriately controlled.

This application is a continuation of International Patent Application No. PCT/JP2020/024671, filed on Jun. 23, 2020, the disclosure of which is incorporated herein by reference in its entirety. International Patent Application No. PCT/JP2020/024671 is entitled to (or claims) the benefit of Japanese Patent Application No. 2019-132820 and No. 2019-132828, filed on Jul. 18, 2019, the disclosure of which is incorporated herein by reference in its entirety.

INDUSTRIAL APPLICABILITY

The refrigeration apparatus according to the present disclosure is suitable for a refrigeration apparatus including a two-way refrigerant circuit, such as an extremely low temperature freezer. Thus, its industrial applicability is wide. In addition, the temperature sensor attaching pipe and the temperature sensor attaching structure according to the present disclosure can be used for measurement of the temperature of a member composed of metal or an object inside it, such as a refrigeration apparatus including a refrigerant circuit. Thus, its industrial applicability is wide.

REFERENCE SIGNS LIST

1 Refrigerant circuit
10 High-temperature side refrigerant circuit
11 High-temperature side compressor
12 High-temperature side condenser
13 High-temperature side decompressor
14 High-temperature side evaporator
15 Dryer
16 Liquid receiver
20 Low-temperature side refrigerant circuit
21 Low-temperature side compressor
22 First heat exchanger
23 Second heat exchanger
24 Low-temperature side decompressor
25 Low-temperature side evaporator
26 Large surface area part
26a Upstream side pipe
26b Downstream side pipe
30 Cascade heat exchanger
40 Controller
101 Temperature sensor attaching pipe
102 Opening end part
103 Seal end part
103a Welding part
104 Constricted part
105 First intermediate part
105a Welding part
106 Second intermediate part
T1 Temperature sensor
200 Refrigerant circuit
201 Temperature sensor attaching pipe
202 Opening end part
203 Seal end part
203a Welding part
204 Constricted part
205 First intermediate part
205a Welding part
206 Second intermediate part
207 Large surface area part
210 High-temperature side refrigerant circuit
211 High-temperature side compressor
212 High-temperature side condenser
213 High-temperature side decompressor
214 High-temperature side evaporator
215 Dryer
216 Liquid receiver
220 Low-temperature side refrigerant circuit
221 Low-temperature side compressor
222 First heat exchanger
223 Second heat exchanger
224 Low-temperature side decompressor
225 Low-temperature side evaporator
230 Cascade heat exchanger
240 Controller
T2 Temperature sensor

The invention claimed is:
1. A refrigeration apparatus comprising:
a high-temperature side refrigerant circuit including a high-temperature side compressor, the high-temperature side refrigerant circuit being a circuit in which high-temperature side refrigerant circulates;
a low-temperature side refrigerant circuit including a low-temperature side compressor, the low-temperature side refrigerant circuit being a circuit in which low-temperature side refrigerant circulates;
a cascade heat exchanger configured to cool the low-temperature side refrigerant by using the high-temperature side refrigerant; and
a controller, wherein:
in the low-temperature side refrigerant circuit, a low-temperature side decompressor is disposed on a downstream of the cascade heat exchanger, and a temperature sensor is installed at a pipe part between the cascade heat exchanger and the low-temperature side decompressor,
the temperature sensor is installed in a temperature sensor attaching pipe,
the temperature sensor attaching pipe extends in a first direction and includes:
a sealed first end part;
a sealed second end part;
a first pipe part extending from the sealed first end part;
a second pipe part extending from the sealed second end part; and
a constricted part disposed between and connected to the first pipe part and the second pipe part along the first direction and having an internal distance measured in a second direction perpendicular to the first direction smaller than an internal distance of the first pipe part measured in the second direction,
an end portion of the temperature sensor, which is closest to the second pipe part, is in contact with a part of the constricted part, which is closer to the first pipe than a center of the constricted part,
the constricted part comprises two convex portions facing each other, and
wherein the controller controls at least one of the high-temperature side compressor and the low-temperature side compressor on a basis of a detection value of the temperature sensor.

2. The refrigeration apparatus according to claim 1,
wherein the pipe part includes a large surface area part, an upstream side pipe connected to the large surface area part from an upstream side, and a downstream side pipe connected to the large surface area part from a downstream side; and
wherein the temperature sensor is installed at the large surface area part.

3. The refrigeration apparatus according to claim 2, wherein the temperature sensor is installed at the large surface area part through the temperature sensor attaching pipe in a state where the temperature sensor is blocked from outside air.

4. The refrigeration apparatus according to claim 3, wherein only the first pipe part is fixed to the large surface area part by a welded part.

5. The refrigeration apparatus according to claim 2, wherein the large surface area part stores the low-temperature side refrigerant.

6. A temperature sensor attaching structure comprising:
a temperature sensor attaching pipe which is metallic and comprises:
   an opening end part including an opening configured for insertion of a temperature sensor;
   a seal end part; and
   a constricted part disposed between the opening end part and the seal end part, and configured to set a position of the temperature sensor; and
an object which is metallic and to which the temperature sensor attaching pipe is attached,
wherein the constricted part comprises two convex portions facing each other, and
wherein only a portion located between the opening end part and the constricted part is fixed to the object by a welded part.

7. The temperature sensor attaching structure according to claim 6, wherein the seal end part is sealed with opposite plate-shaped portions being in contact with each other.

8. The temperature sensor attaching structure according to claim 7, wherein the seal end part is sealed by any of mechanical coupling, material coupling, and chemical coupling, or a combination of any two or more of mechanical coupling, material coupling, and chemical coupling.

9. The temperature sensor attaching structure according to claim 8, wherein the seal end part is sealed by welding.

10. The temperature sensor attaching structure according to claim 9, wherein a distance between the constricted part and the seal end part is greater than a welding length at the seal end part.

* * * * *